(No Model.) 2 Sheets—Sheet 1.

F. D. STEWART & S. B. STEERS.
BALE LIFTING ATTACHMENT TO PRESSES.

No. 306,659. Patented Oct. 14, 1884.

Attest:
E. P. Hough
C. E. Jones.

Inventors:—
Frank D. Stewart.
Schuyler B. Steers.
By Chas. J. Gooch
their Attorney.

N. PETERS, Photo-Lithographer, Washington, D. C.

(No Model.) 2 Sheets—Sheet 2.

F. D. STEWART & S. B. STEERS.
BALE LIFTING ATTACHMENT TO PRESSES.

No. 306,659. Patented Oct. 14, 1884.

ATTEST:
E. P. Hough.
C. E. Jones.

INVENTORS:—
Frank D. Stewart.
Schuyler B. Steers.
By their Attorney Chas. J. Gooch

United States Patent Office.

FRANK D. STEWART AND SCHUYLER B. STEERS, OF NEW ORLEANS, LOUISIANA; SAID STEWART ASSIGNOR TO SAID STEERS.

BALE-LIFTING ATTACHMENT TO PRESSES.

SPECIFICATION forming part of Letters Patent No. 306,659, dated October 14, 1884.

Application filed August 11, 1884. (No model.)

*To all whom it may concern:*

Be it known that we, FRANK D. STEWART and SCHUYLER B. STEERS, citizens of the United States of America, residing at New Orleans, in the parish of Orleans and State of Louisiana, have invented a certain new and useful Bale-Lifting Attachment to Cotton, Hay, and other Presses, of which the following is a specification, reference being had therein to the accompanying drawings.

This invention consists, primarily, in an attachment to the piston or other vertically-reciprocating portion of a cotton, hay, or other press, whereby bales of cotton or other material may, by the vertical reciprocation of that part of the press to which the attachment is connected, be automatically lifted from the ground and raised to the desired height; and, further, in devices for securing the automatic movement or conveyance of the raised bale outward from the press to the desired point of delivery, or to a wagon or other vehicle for removal from the press, without necessitating the lifting of the bales by the workmen, all as hereinafter described and claimed.

Figure 1:
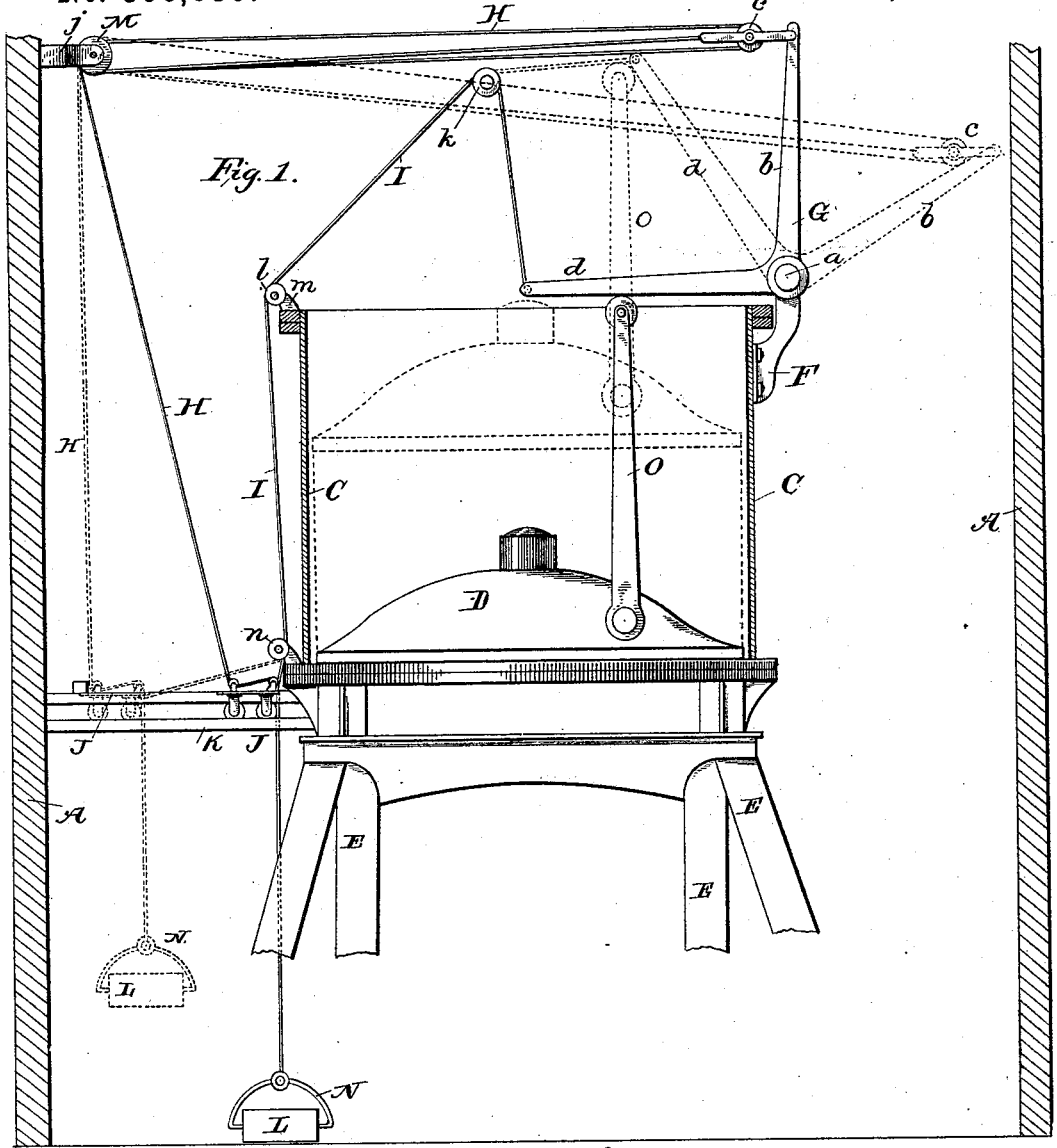
Figure 2:
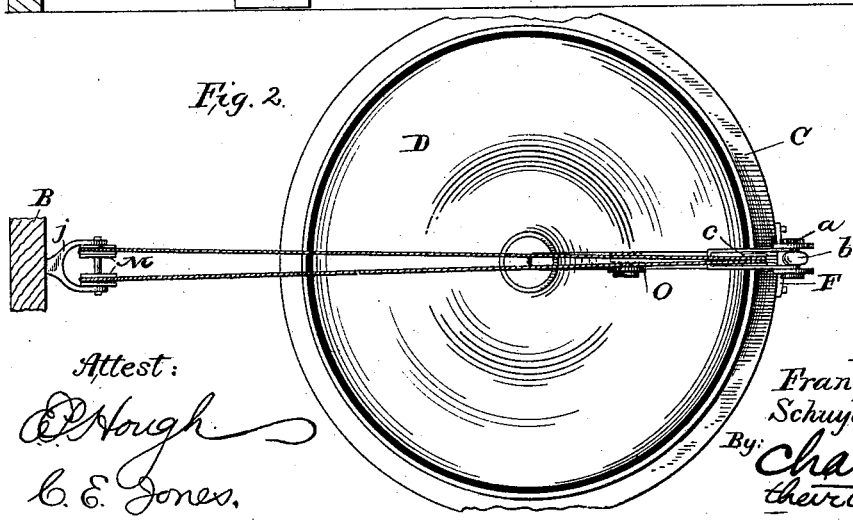
Figure 3:
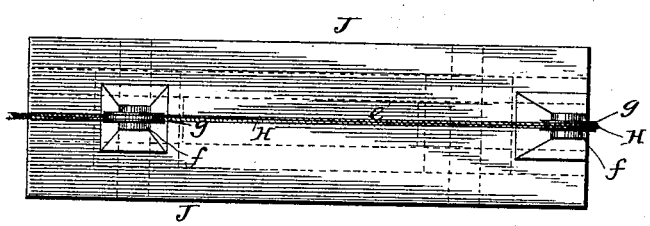
Figure 4:
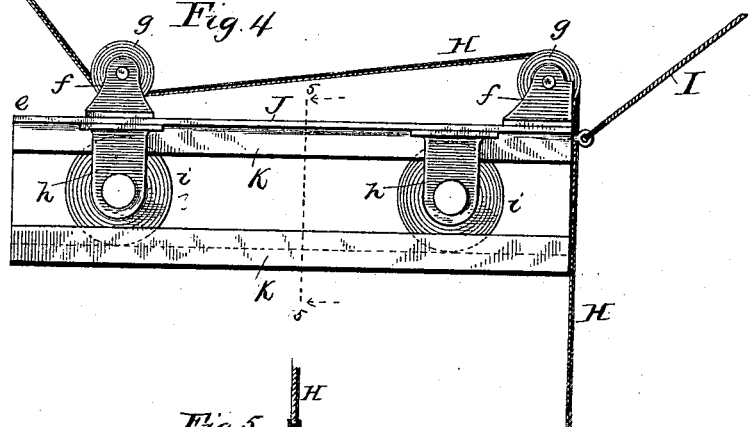
Figure 5:
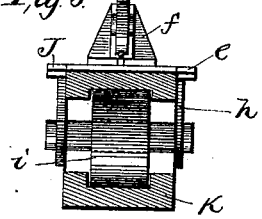

In the accompanying drawings, Figure 1 represents a side elevation of a portion of a cotton-press with our improvements in position. Fig. 2 represents a top view of a cylinder of a cotton-press and that portion of my improvements connected therewith. Fig. 3 represents a top plan view, and Fig. 4 a side elevation, of the carriage and ways hereinafter described; and Fig. 5 represents a vertical section thereof on the line 5 5 of Fig. 4.

Heretofore the heading-up of bales of cotton has required the united strength of two men, and to place said bales upon a dray or wagon the bales have required the united exertions of three men to roll them up skids onto the dray or wagon. As a cotton-press usually turns out from seven hundred to one thousand bales of five hundred pounds each every ten hours, it will be seen that the customary methods of handling the bales not only necessarily consumes much time, but also necessitates the employment of several men for that purpose alone at very fatiguing work and considerable cost.

It is the object of our present improvements to overcome these objectionable features, and to provide for the automatic heading-up and also the raising of bales of cotton and other merchandise from the floor or ground to the desired height, and the carriage of said bale to the appropriate location for delivery to a dray or wagon by the ordinary operation of the press itself, and without the intervention of any manual labor, except for the sole purpose of attaching the bale-lifting mechanism to the bale and releasing it therefrom.

In the drawings we have shown a portion of a cotton-press and of the framing of the building within which such is contained with our improvements connected therewith.

A represents the framing of the building, having transverse joists or beams B a suitable distance above the top of the press.

C represents the cylinder, D the piston, and E the posts or supports, of a press of any kind.

To either the piston D, as shown in the drawings, or to either of the other moving parts of the press—such, for instance, as the cog-sectors, lower platen, pins, or links—is connected, either directly or by the intervention of other parts, as will presently be described, one end of suitable ropes or chains, by means of which, as the piston or other portion of the press rises and falls, the bale will be raised and carried outward through the medium of a carriage, to be hereinafter described.

In the accompanying drawings we have shown what we deem to be the most advantageous arrangement for securing the raising of the bale and its carriage outward from the press to the point of delivery during the upward stroke of the piston, although we do not strictly confine ourselves to such arrangement, as the ropes or chains can readily be connected with other moving parts of the press—such, for instance, as those heretofore mentioned—to secure a similar movement of said ropes, either during the upward or downward stroke of such parts, as found most convenient in each particular instance. We have, however, by experience found it more desirable to secure the raising of the bale during the upward movement of the piston or other member of the press, as by that means a steadier and more uniform motion is secured to the ropes and bale than when the same are actuated on the downstroke of said parts.

In the drawings, F represents an arm or casting, which is attached to one side of the cylinder D by means of bolts and nuts passing through flanges at the lower portion of said arm. This arm F extends outwardly and upwardly, and has pivoted to its upper end, at $a$, a bell-crank lever, G, to the upper end of the outer arm, $b$, of which is attached, by a bracket or otherwise, a pulley, $c$, around which the bale-lifting rope or chain H passes, while to the upper or outer end of the inner member, $d$, of said bell-crank lever G is connected one end of another rope or chain, I. The carriage J is moved horizontally along a track, K, in the manner herein described, for the purpose of carrying the rope H and bale L outward away from the press, and the rope I and its operating mechanism drawing said rope inward in position to receive a bale. The track K is composed of a bottom rail having a grooved upper face, and a top rail having a grooved under face, and is supported at either end in a framing of the building and the press, respectively. The carriage J is composed of a rail or bar, $e$, having on its upper face bearings $f$, within which are pivotally journaled rollers $g$ $g$, around which the rope H passes, while from its bottom depend bearings $h$, between which are pivotally journaled rollers $i$, which fit within the grooved rails of the track, and upon which the carriage travels. From the pulley or roller $c$ the rope or chain H passes to and around one or two more pulleys or rollers, M, journaled in a bracket, $j$, attached to and extending inwardly from the framing or cross-beams of the building. From these rollers the rope H passes down to and partly around the rollers $g$, in the manner represented in the drawings, and from thence depends beneath the carriage, and to the lower end of said rope or chain H is attached pivotal bale-hooks N, by which the bale is grasped. From the upper or outer end of the inner member, $d$, of the bell-crank lever G the rope or chain I, for operating the carriage J, passes up to and over a pulley or roller, $k$, which is journaled in one of the cross-beams of the framing of the building, (not shown,) or to any other suitable support. From thence said rope I passes down to and over another pulley or roller, $l$, journaled in a bracket or arm, $m$, attached to the cylinder C, and from thence to and around another pulley or roller, $n$, at the lower portion of the cylinder, the outer end of said rope I being attached to the inner end of the carriage J, as shown.

O represents an arm or rod, which at its lower end is connected with the top of the piston D, and from thence extends upward to and rests against or is connected by a hinge-joint or otherwise with the inner member, $d$, of the bell-crank lever G; consequently as the piston D rises said arm or rod O is forced upward, and in its turn pushes up the arm $d$, and also forces rearwardly the outer member, $b$, of the bell-crank G, as shown in dotted lines, Fig. 1. As the arm $d$ rises it slackens that portion of the rope I between the roller $k$ and the point of the arm $d$, and permits of said rope passing over said pulley or roller $k$, and also permits of said rope passing over the pulleys or rollers $l$ and $n$, and relieves the tension on the carriage when in its innermost position. As the arm O rises and also forces rearwardly the outer member, $b$, of the bell-crank lever, said lever draws back that portion of the rope or chain H between the rollers $c$ and M, and draws upward over said roller M a portion of the rope H depending therefrom. The consequence of this action is that the upward tension upon said rope will cause the same to first draw the carriage, and with it the lower portion of the rope with the thereto-attached bale, outward in the manner shown in dotted lines, Fig. 1, and when the limit of the outward movement of said parts has been reached the continued rising of the piston and rearward movement of the bell-crank and rope attached thereto will raise that portion of the rope beneath the pulley or roller M, and so raise the bale in the manner shown in dotted lines, Fig. 1.

The distance to which the carriage shall move outwardly can be readily regulated by means of suitable stops inserted or formed in the track, and the time at which the raising of the bale is commenced proportionately regulated.

Another method of regulating the extent of movement of the carriage J relatively to the movement of the bell-crank G and rope H is that by means of the arrangement of the single pulley or roller $c$ and the double pulleys or rollers M in the manner shown, for every foot that the outer member, $b$, of the bell-crank travels rearwardly, the lower end of the rope H, or that portion thereof below the rollers M, will travel two feet; and if, instead of two of such rollers M, three or a triple block be substituted, the movement of the depending portion of the rope will be three feet to one foot of that portion of the rope passing between the points $c$ and M. The same result can be accomplished by using a shaft of different size at two points, said shaft being placed at any suitable position between the side of the framing A and the position of the upper end of the outer member of the bell-crank, such shaft in such case being used as a substitute for the pulleys, and the rope H being in such case arranged to wind around the shaft in opposite directions. Thus on the movement of the arm $b$ from an upright to a slanting position, as shown in dotted lines, Fig. 1, the rope would unwind, while the line would wind up on the other side. If the shaft be the same size at the two places where the line goes around, the line would of course move in its whole length the same as the arm $b$ moves; but any accumulation may be secured by enlarging the shaft where the lower line winds up, thus securing any distance desired from the travel of the car J, and this travel can be so regulated as to adjust the height the bale is required to be lifted, for so long as the car travels the bale will not rise; but as soon as a stop is put to the car the remaining travel of the arm $b$ of the bell-crank will lift the bale. This is important to secure the travel of the bale forward by means of the car, and to regulate exactly the height to raise the bale, and this travel of the car, with its load, can be increased several times by the method of accumulation described, so that if the arm $b$ only moves four feet the car can be made to travel several times that distance, less whatever distance it may be necessary to lift the bale, which can be done by stopping the car at any point. As the piston D descends, the arm or rod O, when connected with the arm $d$, will draw forward the bell-crank lever G and draw down the forward end, $d$, thereof to the position shown in full lines; but the return of the bell-crank may be accomplished in different ways--such, for instance, as by weighting the inner arm, $d$, or by the weighting of the lower end of the rope H, or by simply pulling down upon such rope. As said arm $d$ passes downward it will draw downward upon that portion of the rope or chain I between the end of the arm $d$ and the roller $k$, and draw said rope over rollers $k$, $l$, and $n$, and thus draw back the carriage J to the position indicated in full lines, Fig. 1. As the carriage thus moves inward it will assist to draw back the line H, the end of which having bale-hooks N will then drop down within reach of the workmen, who can then readily draw the same down to and grip the hooks N in the bale, in readiness for raising the same on the next upward stroke of the piston. If desired, a weight may be attached to the rope or line H, near its lower end, to facilitate its return downward movement and to bring the bale-hooks near the floor. When the rope or line H, attached to either the piston or other vertically-reciprocating portion of the press, as the case may be, has been brought to its lowest position by either the rising or falling, as the case may be, of such part of the press, and the hooks N have reached the ground, an operator then grasps the bale-hooks, and if it is desired to head up the bale said hooks are attached to one head of the bale. Then the piston or other part of the press to which the line is attached is lowered or raised, and as said part lowers or rises it will draw with it that part of the line H attached thereto, and correspondingly raise the other end of the line and the thereto-attached bale, and thus head up the bale.

When it is desired to raise a bale from the ground or floor of the building and convey it to a wagon or dray or to any desired spot, the hooks are attached to said bale at or near the center thereof and on opposite sides, in the manner shown in the drawings. By this means the descent or ascent of the piston or other moving part of the press will cause the raising of the bale to a greater height than when the hooks are attached to one end of the bale. When the bale has in this operation reached the appropriate height, it may either be deposited upon a suitable slide or inclined way along which the bale may be slid to a waiting wagon, or else carried forward in its suspended position to said wagon and the hooks released. During the first part of the movement of the piston or other part of the press for raising the rope the carriage J will slide along the track or way and carry with it the line H thereon, and consequently the bale attached to said line, to the appropriate point, upon reaching which the continued upward movement of the rope will cause the thereto-attached bale to rise, and when the desired height thereof has been attained said bale can be readily pushed onto the wagon and released from the hooks N. The line or rope H is some thirty feet long, which length affords ample provision for the swinging thereof and of the bale attached thereto a sufficient distance in either direction.

Having thus described our invention, what we claim is--

1. The combination, with the piston or other vertically-reciprocating portion of a cotton or other press, of a rope, chain, or its equivalent attached thereto at one end, and having at its lower end suitable bale-hooks, and a series of pulleys or rollers journaled above the top of the press, for the purpose of guiding said rope in its horizonal and vertical movements at each reciprocation, substantially as set forth.

2. The combination, with the piston or other vertically-reciprocating portion of a cotton or other press, of a rope, chain, or its equivalent attached thereto at one end, and having at its opposite end a suitable bale hook or hooks, and a horizontally-sliding carriage having a suitable bearing or support, and provided with rollers or pulleys to receive said rope, substantially as and for the purpose set forth.

3. The combination, with the piston or other vertically-moving portion of a cotton or other press, of a chain, rope, or its equivalent attached thereto at one end, and having a bale hook or hooks at its opposite end, a series of pulleys or rollers for supporting and guiding said rope, a horizontally-sliding carriage having a roller or rollers adapted to receive and guide said rope, for the purpose described, and means, substantially as described, for securing the return of said carriage.

4. The combination, with the piston or other vertically-moving portion of a cotton or other press, of a bell-crank lever adapted to be attached to the press, an arm or rod connecting said bell-crank and vertically-moving portion of the press, a rope or ropes connected at one end to said bell-crank, and having at the other end a bale hook or hooks, and a series of pulleys or rollers for guiding said rope or ropes, substantially as and for the purpose set forth.

5. The combination, with the piston or other vertically-moving portion of a cotton or other press, of a bell-crank lever adapted to be attached to the press, an arm or rod connecting said bell-crank and vertically-moving portion of the press, a rope or ropes connected at one end to said bell-crank, and having at the other end a bale hook or hooks, a horizontally-reciprocating carriage having a roller or rollers to receive the bale-raising rope and permit of said rope drawing said carriage forward, a rope or chain connected at one end with the bell-crank lever, and at its other end with said carriage for the purpose of securing the return thereof, and a series of pulleys or rollers for guiding said ropes, substantially as and for the purpose set forth.

In testimony whereof we affix our signatures in presence of witnesses.

FRANK D. STEWART.
SCHUYLER B. STEERS.

Witnesses:
ROBERT BIRNIE,
FRED EYLE,
R. NITUBA,
JNO. H. PIKE.